United States Patent [19]

Franklin et al.

[11] Patent Number: 4,730,485

[45] Date of Patent: Mar. 15, 1988

[54] DETECTOR APPARATUS FOR DETECTING WIND VELOCITY AND DIRECTION AND ICE ACCUMULATION

[76] Inventors: Charles H. Franklin, 1902 Longshore Dr.; Clarence S. Vinton, 1826 Traver St.; Conrad O. Rogne, 2166 Yorktown, all of Ann Arbor, Mich. 48105

[21] Appl. No.: 854,781

[22] Filed: Apr. 22, 1986

[51] Int. Cl.[4] .................................. G01W 1/04
[52] U.S. Cl. ..................... 73/170 R; 73/189
[58] Field of Search ............ 73/170 R, 188, 189, 73/186, 861.74, 862.04, 862.05, 862.06

[56] References Cited

U.S. PATENT DOCUMENTS

| | | |
|---|---|---|
| 2,024,571 | 12/1935 | Gent . |
| 2,462,577 | 2/1949 | Warren . |
| 2,477,238 | 7/1949 | Bristol . |
| 2,778,905 | 1/1957 | Statham . |
| 2,826,914 | 3/1958 | Reiley . |
| 2,844,034 | 7/1958 | Statham . |
| 2,855,779 | 10/1958 | Zaid . |
| 3,114,261 | 12/1963 | Dillon et al. . |
| 3,147,620 | 9/1964 | Stapler . |
| 3,238,773 | 3/1966 | Leigh, Jr. . |
| 3,340,733 | 9/1967 | Lasher . |
| 3,552,204 | 1/1971 | Tourmen ............... 73/189 X |
| 3,878,714 | 4/1975 | Protta et al. .............. 73/189 |
| 4,161,118 | 7/1979 | Banwell et al. . |
| 4,210,021 | 7/1980 | Vykhodtsev et al. . |
| 4,499,761 | 2/1985 | Plank et al. . |
| 4,631,959 | 12/1986 | Motycka ............... 73/189 |

FOREIGN PATENT DOCUMENTS

| | | | |
|---|---|---|---|
| 2917966 | 11/1980 | Fed. Rep. of Germany ... | 73/862.04 |
| 2476322 | 8/1981 | France ............... | 73/189 |
| 56-6111 | 1/1981 | Japan ............... | 73/189 |
| 2128744 | 5/1984 | United Kingdom ............... | 73/189 |
| 0481839 | 10/1975 | U.S.S.R. ............... | 73/189 |

OTHER PUBLICATIONS

Donelan et al., "Miniature Drag Sphere Velocity Probe", Rev. Sci. Instrum., vol. 49, No. 3, Mar. 1978, pp. 298-304.

Heyser-DVL, Berichl Nr. 261, May 1963, Bild 1 and 2.

Primary Examiner—Charles A. Ruehl
Attorney, Agent, or Firm—Ian C. McLeod

[57] ABSTRACT

Detector apparatus (10, 50, 90) for measuring wind velocity and direction and/or ice accumulation. The apparatus preferably includes boots (14, 23, 24 and 70) for removing accumulated ice prior to measuring wind velocity and direction without the ice. A computerized system and program for determining the measurements in the detector apparatus.

25 Claims, 21 Drawing Figures

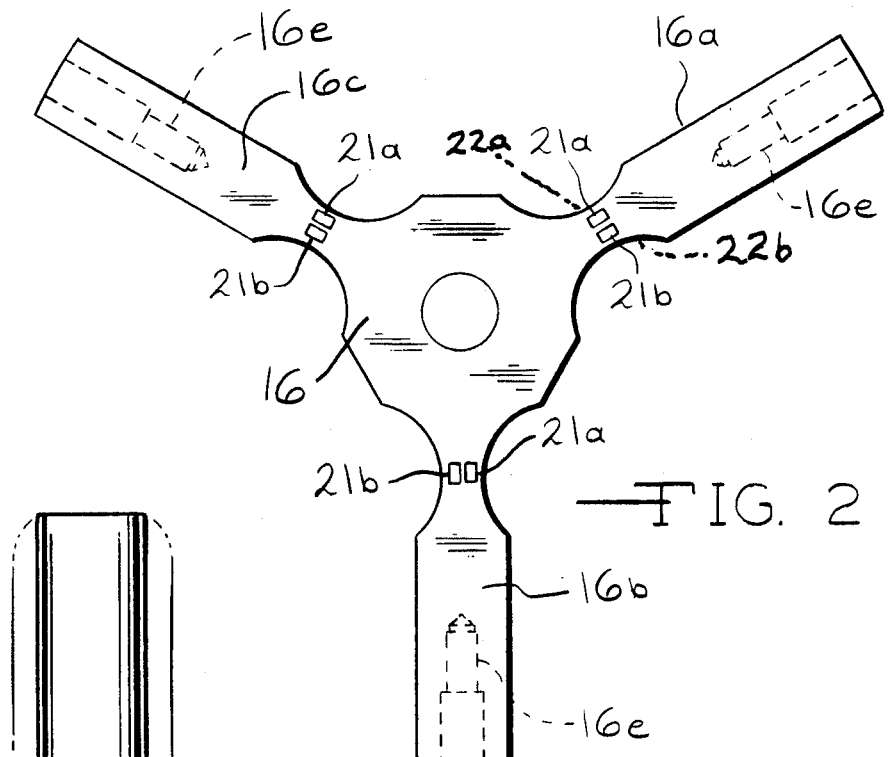
FIG. 2
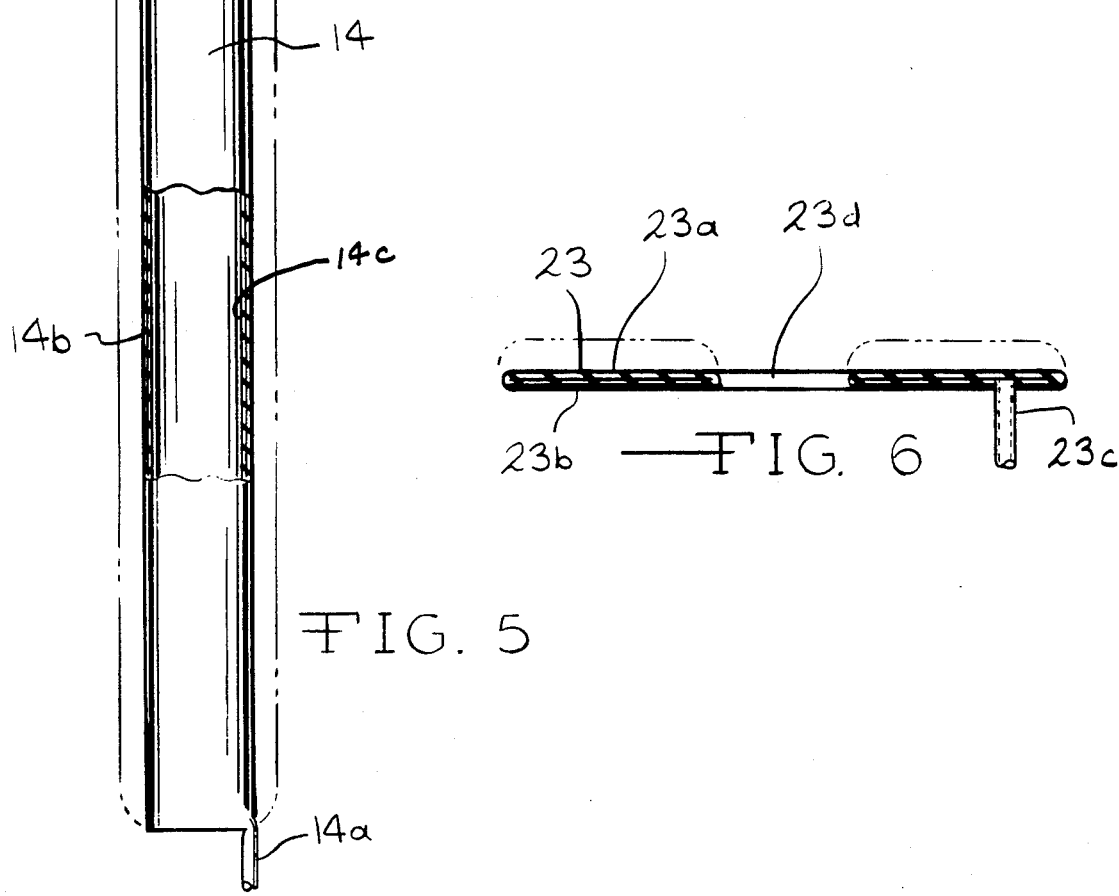
FIG. 5
FIG. 6

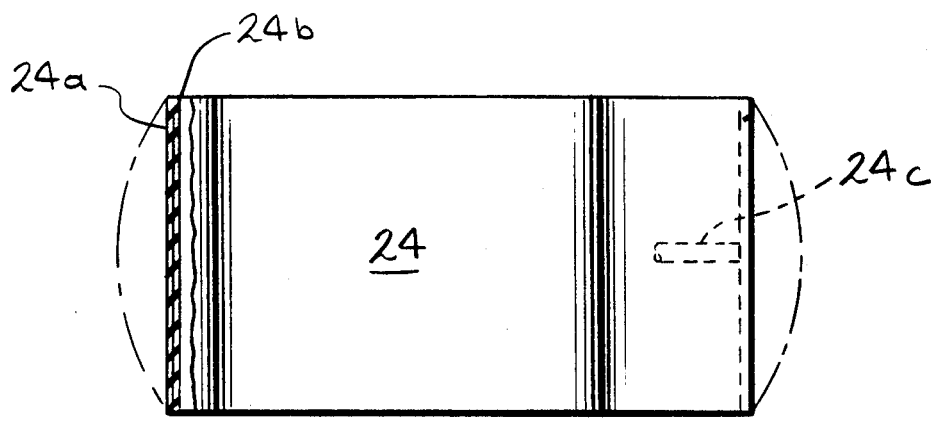
FIG. 7
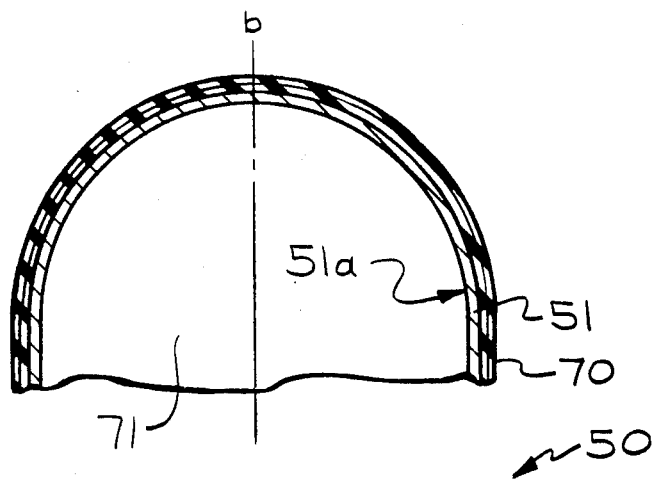
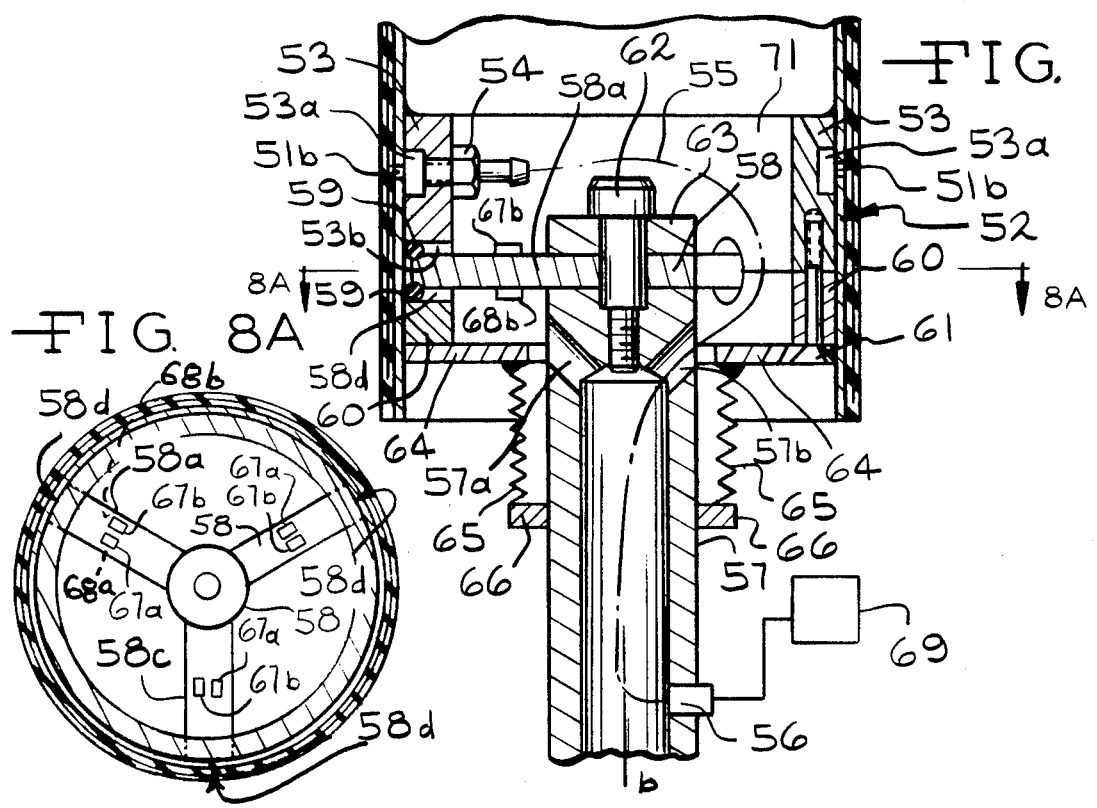
FIG. 8
FIG. 8A

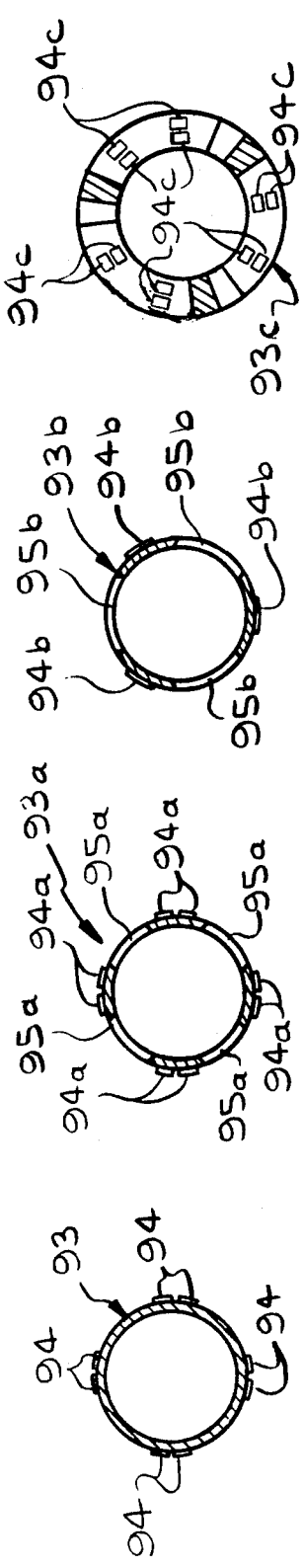

DETECTOR APPARATUS FOR DETECTING WIND VELOCITY AND DIRECTION AND ICE ACCUMULATION

BACKGROUND OF THE INVENTION

(1) Summary of the Invention

The present invention relates to a detector apparatus for measuring wind velocity, direction and/or for measuring ice accumulation or all of these environmental factors. In particular, the present invention relates to a detector apparatus wherein there is no friction between a detecting rod and areas of high stress where the strain is measured, and in its most preferred form uses thin film or foil strain gauges in the area of high stress.

(2) Prior Art

U.S. Pat. No. 3,238,773 to Leigh describes a device which can be used to measure wind velocity. The disclosed apparatus uses a fulcrum to pivot the rod 5 and thus is relatively insensitive. The fulcrum introduces a friction factor which provides variable results, particularly where there are wide temperature variations. There is a suggestion of 360° measurement of wind velocity by the rod 5 but there is no specific discussion of the means for accomplishing this result. The device is not designed to measure weight loads on the rod 5 along the longitudinal axis and no means is provided for removing accumulated ice other than by electrical thawing. the resistance wires of Leigh are relatively insensitive strain gauges.

Most of the prior art devices are designed to detect fluid flow in only one direction in a pipe or conduit as evidenced by the basic disclosure of Leigh and the disclosures of U.S. Pat. Nos. 2,826,914 to Reiley and 3,340,733 to Lasher. None of the apparatus of these references are designed to measure weight loads along the axis perpendicular to the direction of fluid flow.

Other less relevant prior art references are U.S. Pat. Nos. 2,024,571 to Gent, 2,462,577 to Warren, 2,477,233 to Bristol, 2,778,905 to Statham, 2,844,034 to Statham, 2,855,779 to Zaid, 3,114,261 to Dillon et al, 3,147,620 to Stapler, 4,161,118 to Banwell et al, 4,210,021 to Vykhodtsev et al, and 4,499,761 to Plank et al. Generally these patents describe devices which have a single purpose.

OBJECTS

It is therefore an object of the present invention to provide a detector apparatus where there is no friction between a detecting rod and strain gauges. It is further an object of the present invention to provide an apparatus which allow measurements of ice formations and the wind loads on the ice formations. It is further an object of the present invention to provide an apparatus which can detect wind load and orientation without repositioning. Further still it is an object of the present invention to provide an apparatus with means which de-ices the detecting rod. Further still, it is an object of the present invention to provide a preferred system which incorporates the detector apparatus and a method for using the apparatus. These and other objects will become increasingly apparent by reference to the following description and the drawings.

IN THE DRAWINGS

FIG. 1 is a front cross-sectional view of the detector apparatus of the present invention particularly illustrating the rod 11 rigidly joined to hub 16 and also illustrating two arms 16a and 16b (of three) and one of two foil strain gauges 21b and 22b on each of the upper and lower surfaces of each arm.

FIG. 2 is a plan view of a hub 16 with three arms 16a, 16b and 16c each supporting foil strain gauges 21a and 21b on an upper surface of each arm.

FIG. 2A is a front partial sectional view of one am 16b mounted on a cylindrical member 15b which is part of support assembly 15 for the hub 16.

FIG. 3 is a plan view along line 3—3 of FIG. 1 showing the rod 11 and boot 14.

FIG. 4 is a plan cross-sectional view along line 4—4 of FIG. 1 particularly illustrating a position alignment key 30.

FIG. 5 shows a front view in partial section of the expandable boot 14 shown in FIG. 1 wherein the expansion of the boot 14 is shown in dotted lines.

Figure 1:
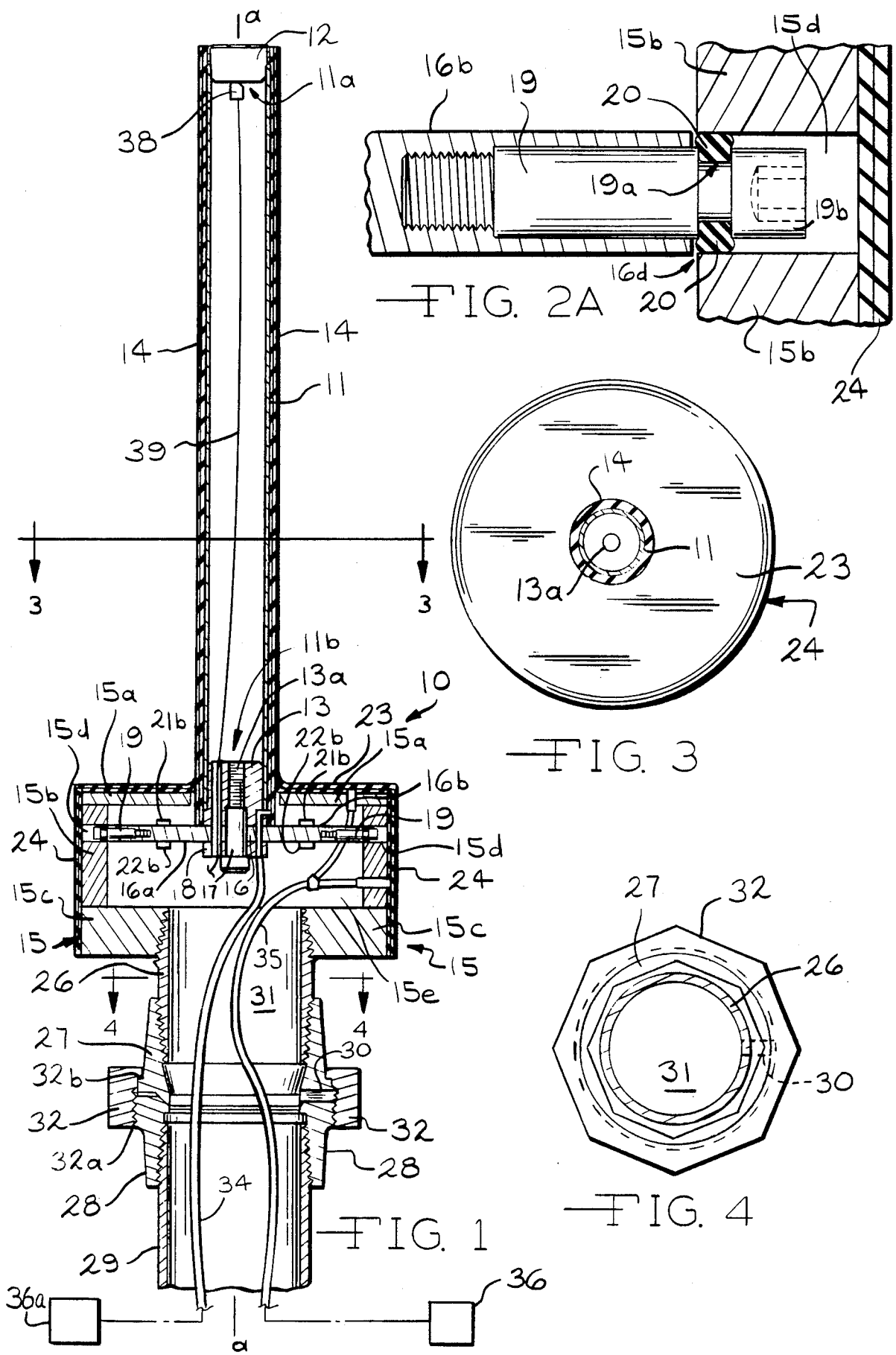

FIG. 6 shows a front cross-sectional view of another expandable boot 23 for the upper platform 15a of the support assembly 15 shown in FIG. 1 wherein the expansion of the boot 23 is shown in dotted lines.

FIG. 7 is a front view in partial cross-section of the expandable boot 24 for the cylindrical member 15b shown in FIG. 1, wherein the expansion of the boot 24 is shown in dotted lines.

FIG. 8 is a front cross-sectional view of an alternative embodiment of the detector apparatus 50 wherein the rod 51 is enlarged over the rod 11 shown in FIG. 1 for more sensitive wind velocity measurement.

FIG. 8A is a plan cross-sectional view along line 8A—8A of FIG. 8.

Figure 9:
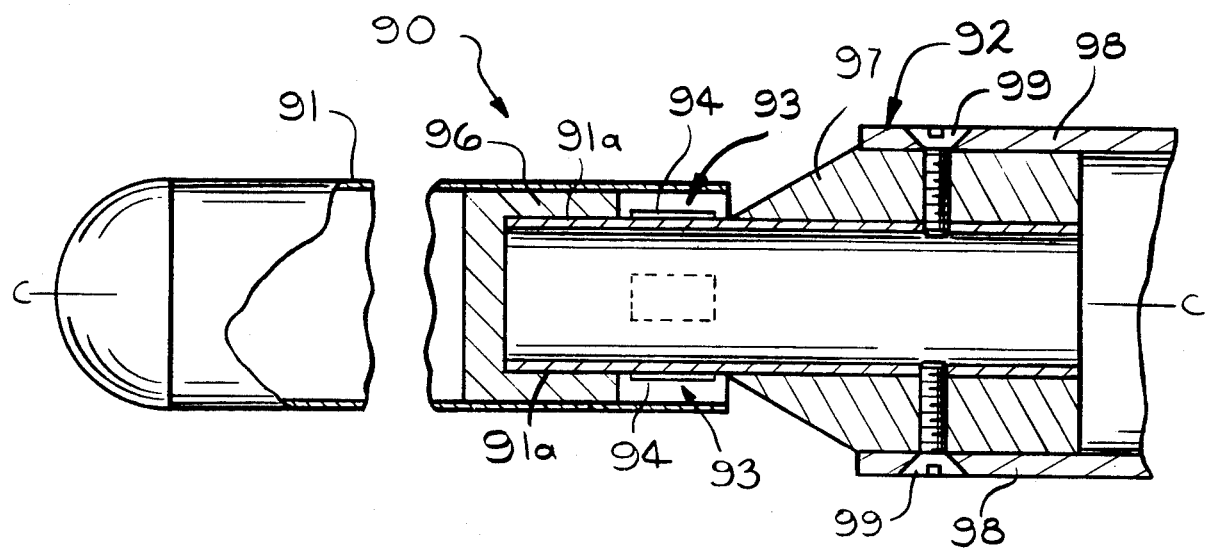

FIG. 9 is a front cross-sectional view of another embodiment of the apparatus 90 wherein the foil strain gauges 94 are mounted in areas of high stress 93 in line with the longitudinal axis c—c of the rod 91 and adjacent the support assembly 92.

FIG. 9A is an isolated view showing the high stress area 93 of FIG. 9. FIGS. 9B to 9D show alternative mountings of the foil strain gauges 94a, 94b and 94c on a rod extension 91a with openings 95a, 95b and 95c having various configurations. FIGS. 9A1 to 9D1 are plan cross-sectional views of FIGS. 9A to 9D.

Figure 10:
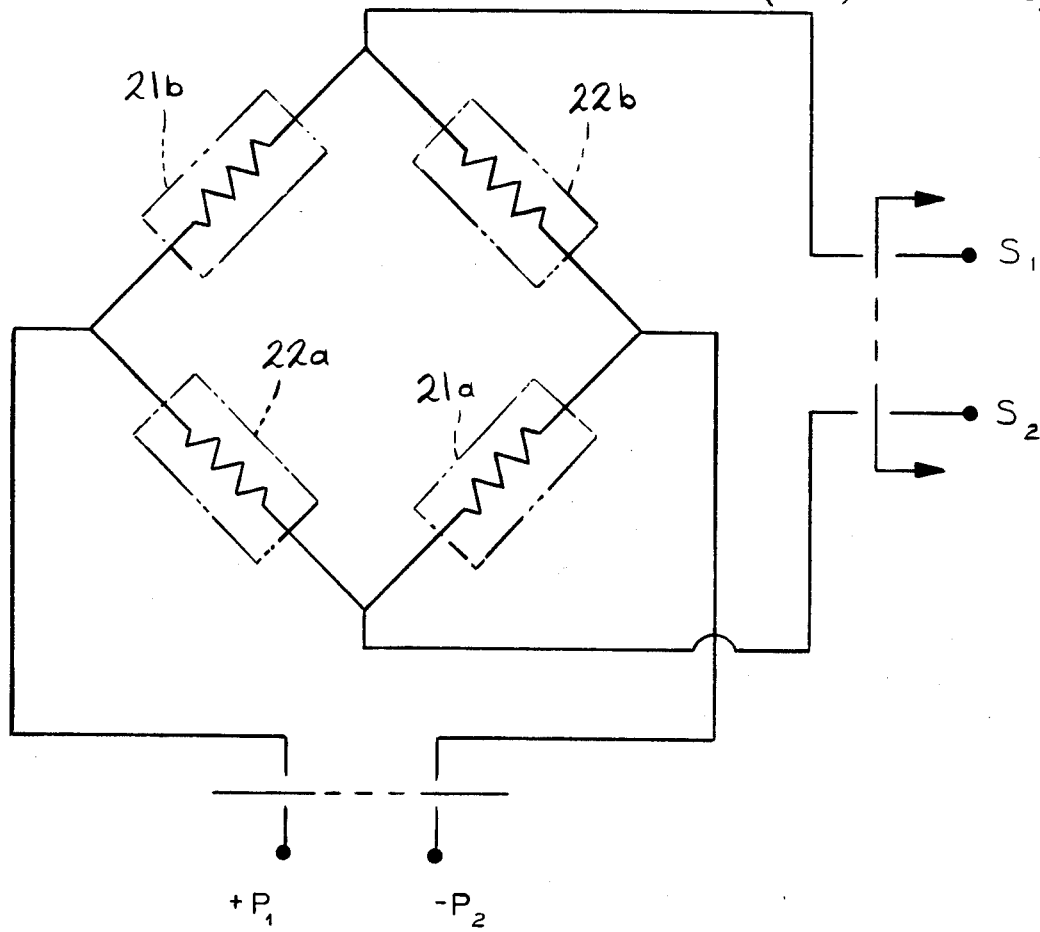

FIG. 10 is a schematic of the bridge circuit employing strain gauges 21a and 21b and 22a and 22b on one arm 16a, 16b or 16c.

Figure 11:
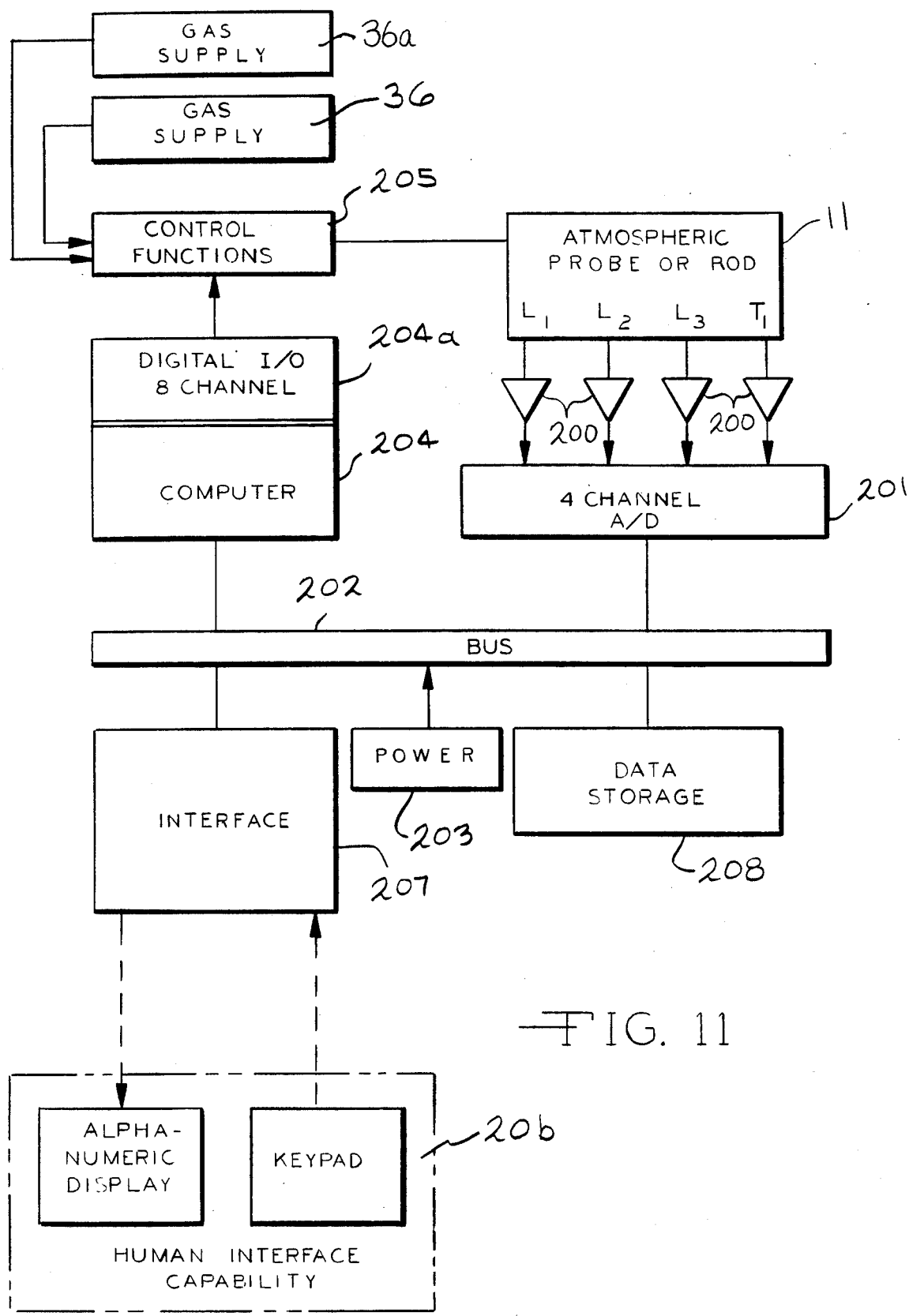

FIG. 11 is a schematic view showing the system for input and output of data from the detector apparatus 10, 50 or 90.

GENERAL DESCRIPTION

The present invention relates to a detector apparatus which comprises: an elongate cylindrically shaped rod having a longitudinal axis and two opposed ends along the longitudinal axis with one end supported and the other end unsupported; support means rigidly mounting the one end of the rod such that the rod is cantilevered from the support means and wherein there is a region of high stress in tension and compression in the rod or support means when a force is applied to the rod; and electrical strain gauges mounted on the region of high stress in uniform relationship to and around the longitudinal axis of the rod, wherein the apparatus can measure wind velocity and direction around the longitudinal axis of the rod or can measure weight of accumulated ice on the rod as a function of time in relation to compression or tension on the strain gauges.

The present invention further relates to a detector apparatus which comprises: an elongate cylindrically shaped rod having a longitudinal axis and two opposed ends along the longitudinal axis with one end supported and the other end unsupported; identical arms rigidly supporting the one end of the rod and extending from the rod to arm ends around the longitudinal axis of the rod, wherein each of the arms has a section of substantially identical cross-section adjacent the rod where tension and compression are to be measured along one line in the section; support means rigidly mounting the ends of the arms such that the rod is cantilevered from the support means by the arms; and electrical resistance film strain gauges rigidly mounted on the section of the arms in uniform relationship to and around the longitudinal axis of the rod to measure tension and compression along the line in the section, wherein the apparatus can measure wind velocity and direction around the longitudinal axis of the rod or can measure weight of accumulated ice on the rod as a function of time in relation to the compression or tension on the strain gauges.

Further the present invention relates to a detector apparatus which comprises: an elongate cylindrically shaped rod having a longitudinal axis and two opposed ends with one end supported and the other end unsupported; a hub rigidly supporting the one end of the rod and having identical arms which extend radially away from the rod to radial ends and perpendicular to the longitudinal axis of the rod wherein each of the arms has a section of substantially identical cross-section adjacent the rod where tension or compression is to be measured along one line of the section; support means rigidly mounting the radial ends of the arms such that the rod is cantilevered from the support means by the hub and arms; and electrical resistance film strain gauges rigidly mounted on the section of the arms in uniform spaced radial relationship to and around the longitudinal axis of the rod, wherein the apparatus can measure wind velocity and direction around the longitudinal axis of the rod or can measure weight of accumulated ice on the rod as a function of time in relation to compression or tension on the strain gauges.

Further the present invention relates to a detection system which comprises: an elongate cylindrically shaped rod having a longitudinal axis and two opposed ends along the longitudinal axis with one end supported and the other end unsupported; support means rigidly mounting the one end of the rod such that the rod is cantilevered from the support means and wherein there is a region of high stress in tension and compression in the rod or support means when a force is applied to the rod; and electrical strain gauges mounted on the region of high stress in uniform relationship to and around the longitudinal axis of the rod, wherein the apparatus can measure wind velocity and direction around the longitudinal axis of the rod or can measure weight of accumulated ice on the rod as a function of time in relation to compreession or tension on the strain gauges and microprocessor means electrically connected to the strain gauges which are connected in a bridge circuit, wherein the microprocessor means converts electrical signals from the strain gauges to digital data.

Finally the present invention relates to a method for measuring wind velocity or accumulated ice which comprises: providing a detector apparatus in the environment which comprises a detector apparatus which comprises: an elongate cylindrically shaped rod having a longitudinal axis and two opposed ends along the longitudinal axis with one end supported and the other end unsupported; support means rigidly mounting the one end of the rod such that the rod is cantilevered from the support means and wherein there is a region of high stress in tension and compression when a force is applied to the rod; and electrical strain gauges mounted on the region of high stress in uniform relationship to and around the longitudinal axis of the rod, wherein the apparatus can measure wind velocity and direction around the longitudinal axis of the rod or can measure weight of accumulated ice on the rod as a function of time in relation to the compression or tension on the strain gauges; measuring the wind velocity or the accumulated ice weight in the environment from the strain gauges.

The signal from the strain guages can be supplied to an analog metering device (not shown) or to a computer as shown in FIG. 11. The use of a computer is preferred for ease of measurement.

SPECIFIC DESCRIPTION

FIGS. 1 to 7 show the details of a preferred detector apparatus 10 of the present invention. The apparatus 10 includes an elongate cylindrical rod 11 which is hollow and preferably made of a weather resistant material such as aluminum. One end 11a of the rod 11 is closed by an upper cap 12 which seals the inside of the tube 11. The opposite end 11b is closed by a lower cap 13 with a threaded opening 13a. The rod 11 has a longitudinal axis a—a between the caps 12 and 13 which is used as a reference in the description and the claims. The rod 11 is enclosed by an inflatable boot 14 which will be discussed more fully hereinafter.

A support or base assembly 15 rigidly mounts the rod 11 and includes an upper platform 15a in the form of a disc perpendicular to the axis of the rod 11 which is supported by a hollow cylindrical member 15b mounted on a lower platform 15c. The cylindrical member 15b is provided with cylindrical openings 15d radially around the longitudinal axis a—a of the rod 11 which are equidistant from the axis a—a.

A hub 16 with radial arms 16a, 16b and 16c extending from the hub 16 is mounted inside the space 15e in the support or base assembly 15 on the lower cap 13 by a bolt 17 and washer 18. Threads on the bolt 17 engage the threaded opening 13a of the lower cap 13. The distal ends 16d of the radial arms 16a, 16b and 16c are mounted on cylindrical member 15b by means of bolts 19 which engage threaded openings 16e (FIG. 2) of the arms 16a, 16b and 16c. As shown in FIG. 2A, the bolts 19 include a groove 19a adjacent the bolt head 19b which supports an O-ring 20 which is made of a rigid rubber material. The O-ring 20 supports the distal ends 16d of the arms 16a, 16b and 16c in the cylindrical member 15b which is to provide cantilevered support for the arms 16a, 16b and 16c. Alternatively the distal ends 16d could be rigidly mounted to the cylindrical member 15b (not shown).

Electrical resistance foil strain gauges 21a and 21b and 22a and 22b are mounted equidistant from the longitudinal axis a—a on each of the upper and lower sides of each arm 16a, 16b and 16c. The foil strain gauges 21a and 21b and 22a and 22b are wired into an electrical bridge circuit as discussed hereinafter and as shown in FIG. 10. There is preferably one set of strain gauges 21a and 21b on the top and 22a and 22b on the bottom of each arm 16a, 16b and 16c.

The outside of the support assembly 15 is also preferably provided with inflatable boots 23 and 24 for ice removal. The boots 23 and 24 will be discussed further hereinafter.

The support assembly 15 is mounted on a first support circuit 26. As shown in FIG. 1, the support conduit 26 threads into an opening in the lower platform 15c and into a connector 27 which mates into connector 28 mounted on a second support conduit 29. A key 30 orients the connectors 27 and 28 so that the rod 11 is always positioned in the same direction relative to the support conduit 29 which is fixed in position. A chamber 31 is provided between conduits 26 and 29. A threaded collar 32 holds the connectors 27 and 28 together by means of threads 32a and ridge 32b in a conventional manner know to those skilled in the art. Conduits 26 and 29 provide access for electrical and gas connection. The gas connection is made by lines 34 and 35 from gas supplies 36 and 36a. The wires to the gauges 21a, 21b, 22a and 22b are not shown.

Referring to FIGS. 5, 6 and 7 the boots 14, 23 and 24 are shown. The boot 14 has a conduit 14a which leads inside the boot 14 which is constructed similar to a reinforced balloon with walls 14b and 14c joined together at their periphery and preferably every 60° to 90° in a line along the axis a—a of the rod. The wall 146 expands when a gas is introduced into the boot 14. The boot 23 has walls 23a and 23b which are joined together at their periphery and conduit 23c leads between the walls 23a and 23b an around opening 23d for the rod 11 and boot 14 to expand the boot 23 as shown by the dotted lines. The boot 24 has walls 24a and 24b which are joined together at their periphery. The wall 24a expands when a gas is introduced between the walls 24a and 24b by means of conduit 24c as shown by the dotted lines. The conduits 23c and 24c are joined together by a tube 35. Gas is introduced into the tube 35 from the gas supply 36, such as from a nitrogen source or an air pump. Gas is introduced to boot 14 by conduit 34 from the gas supply 36a so that it is separately controlled to remove ice. As can be seen, when the gas is introduced by conduits 34 and 35 to the boots 14, 23 and 24, they each expand and fracture and clear any ice. Preferably the boots 14, 23 and 24 are made of an elastomeric rubber (such as silicone) which is smooth so that ice does not adhere and which retains elasticity at use temperatures. FIG. 1 shows a temperature probe 38 with an electrical lead 39 going through lower cap 13. The probe 38 is discussed hereinafter.

FIGS. 8 and 8A show a detector apparatus 50 variation of the apparatus 10 shown in FIGS. 1 to 7. The main difference in the construction of the apparatus 50 of FIG. 8 is that the rod 51 is as wide as the base assembly 52 which supports the rod 51. A cylindrical member 53 is secured to the inner wall 51a of the cylinder 51. A circumferential groove 53a is provided around the outside of the member 53 which leads to openings 51b through the rod 51. A fitting 54 is mounted on the inside of member 53 which is connected by means of conduit 55 through the post 57 supporting the rod 51. The post 57 has multiple openings 57a and 57b which provide passage for the conduit 55 and for electrical leads (not shown) to the strain gauges 67a, 67b and 68a and 68b.

The post 57 supports a hub 58 with radial arms 58a, 58b and 58c as shown in FIG. 8A. The distal ends 58d of the radial arms 58a, 58b and 58c are supported in openings 53b in member 53 on o-rings 59. A lower cylindrical member 60 is connected to cylindrical member 53 by means of bolts 61. The hub 58 is secured to the post 57 by means of washer 63 and bolt 62 which threads into the post 57. A disc shaped member 64 partially encloses the space 71 which is around the post 57. A bellows 65 is mounted on a ring 66 secured to the post 57. This provides a vented seal on the underside of the apparatus 50 adjacent the rod 51.

Electrical resistance foil strain gauges 67a, 67b and 68a and a second gauge not shown are rigidly bonded on the upper and lower sides of the arms 58a, 58b and 58c which are electrically connected to bridge circuits such as shown in FIG. 10.

As in FIG. 1, gas is supplied from a supply means 69 through valve 56 to the boot 70 mounted around the rod 51 to remove accumulated ice from the apparatus 50. The vented bellows 65 prevents airborne contaminants from accumulating inside the space 71 of the apparatus 50.

FIGS. 9, 9A and 9A1 show another modification of apparatus 90 of the present invention. A rod extension 91a extends from a base assembly 92 to support a rod 91. The rod extension 91a is hollow and has an area of high stress 93 adjacent the base assembly 92. Electrical resistance foil Strain gauges 94 are mounted on the outside (or inside) of the rod extension 91a and are electrically connected to a bridge circuit such as shown in FIG. 10. In this apparatus 90 no ice removal boot is shown; however, one could be used. FIGS. 9B, 9B1, 9C, 9C1, 9D and 9D1 show variations of the area of high stress 93 of FIG. 9A wherein openings 95a, 95b and 95c are provided in the area of high stress to provide arms 93a, 93b and 93c extending from the rod extension 91a.

The rod extensions 91a, 91b, 91c or 91d are rigidly mounted on a cap 96 which is in turn rigidly mounted inside the rod 91. The rod extensions 91a, 91b, 91c or 91d are rigidly mounted on support assembly 92 by means of insert 97 mounted within post 98 and held in place by screws 99. The post 98 is suitably supported in the ground or on a building (not shown).

FIG. 10 shows the bridge circuits used on each arm 16a, 16b and 16c. The three bridge circuits together measure the position of and amount of the load on the rod 11 360° around the axis a—a as well as the total load on the strain gauges 21a and 21b and 22a and 22b which is the weight.

The leads $P_1$ and $P_2$ shown in FIG. 10 provide DC power to the bridge circuits. The outlets $S_1$ and $S_2$ provide the differential current and voltage coming from the foil srain gauges 21a, 21b, 22a and 22b. The fine wires (not shown) inside the foil srain gauges 21a, 21b, 22a and 22b are mounted with the wires along the direction of the load as is known to those skilled in the art. Where the foil gauges are in tension the resistance increases because of the reduction of the diameter of the conductor deposited on the foil. The compression of the opposite gauges 21a, 21b or 22a, 22b decreases the resistance of the conductor. The foil is bonded to the area where there is a high stress by using an epoxy resin or the like. The foil strain gauges 21a, 21b, 22a and 22b are available from various sources, particularly BLH Electronics located in Waltham, Mass.

FIG. 11 shows the system including the temperature probe 38. The analog signals $S_1$ and $S_2$ detected by the foil strain gauges are applied to $L_1$ from arm 16a, to $L_2$ from arm 16b and to $L_3$ from arm 16c (FIG. 2). The signal $T_1$ is from the temperature probe 38 fed by conductor 39. The analog signals are fed through amplifier 200 to an analog to digital converter 201. The digital signal from converter 201 is fed to a bus 202 which is provided with power supply 203. A computer 204 and input-output device 204a handles the data for a control function device 205 controlling the gas supplies 36 and 38. An alpha numeric display and keyboard 206 provides operator access through interface 207 to the computer 204. The system has data storage 208.

OPERATION

Design Criteria

The drag coefficient ($C_D$) for cylinders as a function of Reynolds Number ($R_N$) shows a region of substantial constant $C_D$ of about 1.2 for $R_N \cong 10,000$ to $\cong 200,000$. Further, the $C_D$ change is small for $R_N = 1,000$ to 10,000. This data is for cylinders of infinite aspect ratio (length/diameter (L/D) ratio). However, it is representative for cylinders having aspect ratios of 10 to 1 and higher. The effective aerodynamic aspect ratio or L/D of the cylindrical rod 11 which was tested was larger than 10 to 1.

Calculations solving for velocities for the range of $R_N$ where $C_D$ is constant at 1.2:

$$R_N = \rho D V / \mu$$

$$V = R_N \mu / \rho D$$

Where:
$\rho$ = slug per cubic foot.
slug = pound-sec$^2$ per foot
$\mu$ = slugs per foot-second.
D = rod diameter in feet
V = velocity in feet per second.

$$V = 10,000 * 3731.5 * 10 - 10 / 0.002378 * 0.0958$$

(For $R_N = 10,000$)

$$V = 16.4 \text{ ft/sec or } 11 \text{ MPH}$$

and $$V = 200,000 * 3731.5 * 10 - 10 / 0.002378 * 0.0958$$

(For $R_N = 200,000$)

$$V = 327 \text{ ft/sec or } 223 \text{ MPH}$$

, where "*" is the computer symbol for multiplication.

The next consideration is to fit the diameter of the cylindrical rod 11 with specifications for a test on Mt. Washington. The diameter of 1.15 inches for rod 11 was selected. Correcting for Mt. Washington conditions, this diameter allows a wind velocity range of about 15 to 250 MPH in the $R_N$ range of interest.

The detector apparatus 10 was designed with foil strain gauges 21a and 21b and 22a and 22b on each of the arms 16a, 16b, 16c which were 120 degrees apart. This construction has no redundant members and permits the forces to be easily resolved. The design renders the strain gauges 21a, 21b, 22a and 22b insensitive to horizontal force, so that the wind loads are applied to the strain gauges 21a and 21b and 22a and 22b as as pure moment. When the wind forces on the three arms 16a, 16b and 16c are added, they equal zero without any vertical component force. Any residual reading will be ice load or the weight of the cylindrical rod 11. Usually the weight of the rod 11 is zeroed out.

INSTRUMENTATION

Strain Gauges 21a and 21b and 22a and 22b

Each of the three arms 16a, 16b and 16c were instrumented with four BLH Electronics FAE2-35-S13EL foil strain gauges. These are dual gauges so only one is required on each side of arms 16a, 16b or 16c. The strain gauges 21a, 21b and 22a and 22b on the upper and lower surfaces of the arms 16a, 16b and 16c were used to measure ice loads, wind speed, and wind direction. Thus there were four active gauges 21a, 21b, 22a and 22b in each of the ice weighing circuits on each arm 16a, 16b and 16c, to insure that the bridges were temperature compensated and provide more sensitivity than would otherwise be achievable. The apparatus 10 was fabricated from 2024-T3 aluminum, and the strain gauges 21a, 21b, 22a and 22b used were selected to match the coefficient of expansion of this material to give added thermal stability to the bridge circuits of FIG. 10.

Temperature Measurement

A temperature measuring probe 38 (platinum RTD) was provided in the detector apparatus 10. The probe 38 provided not only the current temperature, but also temperature histories for potential use in comparisons of ice formation types (glaze, hard rime, or soft rime, etc.). Knowing the temperature of the load cell allows the computer 204 to make corrections for drift caused by temperature changes. The probe 38 was cemented to the inside of the rod 11 adjacent the cap 12.

Signal Conditioning Components

The converter 201 had 12 channels provided in 3 groups of 4 channels each. The first group (channels 00, 01, 02, and 03) was dedicted for the strain gauges of $L_1$, $L_2$, and $L_3$, respectively as shown in FIG. 11. Channel 04 of the second group were used to monitor the temperature probe 38 designated as $T_1$ in FIG. 11. Channel 08 of the third group was used to monitor strain gauge voltage. A 0 to 15 VDC power supply 203 was used to supply power to the strain gauge circuits. Since the voltage was actually found to vary slightly during the power supply warm up period, provisions for a voltage monitoring were made. An eight channel I/O board 204a in computer 204 was added to control solenoid valves (not shown) as part of the control function 205 supplying gas to the pneumatic de-icer boots 14, 23 and 24 from supplies 36 and 36a. The electronic components of the system other than the detector apparatus 10 were maintained at 25° C. by various well known means such as by using a room or a heated confined space (not shown).

Computer and Software

The software program (printout is attached as Appendix A) controlled the detector apparatus and time coded and recorded data. An extension of the program reduced the raw data into weight of ice present, wind speed, and wind direction for viewing on the monitor. In addition, it showed the status of the de-icer boots 14, 23 and 24. Also, displayed was the date, time, and current status of the strain gauge 21a, 21b, 22a and 22b circuits as shown in FIG. 10, temperature readings ($T_1$), and the voltage applied to the strain gauge bridge circuits ($P_1$ and $P_2$).

Calibration

Weight calibrations of the strain gauges 21a, 21b, 22a and 22b were done in 0.1 lb increments to 2.0 lbs prior to installation at the test site. This allowed the gain values to be set in each circuit such as shown in FIG. 10.

MT. WASHINGTON TESTS

The equipment of FIGS. 1 to 8 was tested on a site at 6288 feet. The microcomputer 204, monitor 206, and a printer (not shown) were mounted in an instrument room. An instrument case (not shown) containing the A/D converter and associated electronics were positioned in a cold room.

The rod 11 was mounted on an instrument mounting post 29 in a position such that it was not affected by other instruments. The instrument mounting post 29 was a standard two-inch pipe. The detection apparatus 10 was connected to the mounting post 29 and oriented using connectors 27 and 28 with key 30 facing North.

The electrical cables and pneumatic tubing for the strain gauges 21a, 21b, 22a and 22b were run down through the connectors 27 and 28 and the instrument mounting post 29 to an instrument case in a room below. The open area between the electrical cables, the pneumatic tubing and the inside of the post 29 were sealed to prevent air flow through the post 29 and into the support assembly 15.

The icing conditions that occurred during the first test period caused the formation of soft rime ice. The pneumatic boots 14, 23 and 24 functioned well in the soft rime icing conditions.

De-Icer Function

The ice detector 10 was provided with the de-icer boots 14, 23 and 24 as previously discussed. The boot 23 prevents the ice formations from bridging the collection rod 11 to the upper platform 15a. The platform 15a is parallel with the wind stream and does not collect much ice. The skirt boot 24 removed ice formations from the support assembly 15 normal to the wind. The hole 23d in the deck boot 23 permitted mounting of the rod 11 and its boot 14. The clearance gap between the two boots 14 and 23 was covered by boot 23 tö allow unrestricted movement of the rod 11. Unrestricted movement of the rod 11 was necessary so that the loads on the rod 11 were transmitted to the strain gauges 21a, 21b and 22a and 22b and not to the upper platform 15a.

Software Set-up Variations

The software was designed so the de-icing boots 14 and 23 and 24 would function independently on a time controled cycle and/or a weight controlled cycle. The control mode can be entered into the computer 204 easily at the beginning of a test. For example, the boot 23 used to de-ice the upper platform 15a and boot 24 for cylindrical member 15b was set up to operate every 20 minutes, and the boot 14 for the rod 11 can be set to operate when the weight of accumulated ice reaches 0.2 lbs. In addition, the upper plate 15a and cylindrical member 15b can be de-iced prior to the data acquisition command.

Data Sample

The software program allowed the sampling period and the number of samples during the period to be entered before each test. The computer 204 required about 3 seconds to take one sample. It averaged the samples taken between the acquisition periods. Sampling was not done while the de-icing boots 14, 23 and 24 were being actuated.

Anemometry

During testing the apparatus 10 agreed with the observed wind direction. The agreement with observed wind speed was very good when the apparatus 10 was clear of ice formations. The apparatus 10 indicated the wind load on the formation when it is burdened with ice.

Test Data

Most of the tests were run with the ice weight thresholds set at between 0.1 and 0.3 lbs. of ice collected on the cylinder, because experience indicated if ice formations grew much heavier than this, the de-icer boots 14, 23 and 24 would have problems completely removing them. When the ice weight threshold set point was reached the boots 23 and 24 were set to inflate and remove ice that might have bridged between the boot 23 and the boot 14 on rod 11. A final data point was taken before the rod 11 was de-iced by boot 14.

The following is a description of the results of two (2) tests.

TEST EXAMPLE 1

The Ice threshold was set at 0.20 pound. The test started with the temperature above freezing and the winds light and variable. As the temperature dropped below 0° C., ice started to form on the boot 14 when the winds were low. As the wind increased, the ice accreted at a more rapid rate until the threshold weight was reached. The ice was cleared from the deck plate 15a and cylindrical member 15b by boots 23 and 24. A data point was taken before removing the ice from the boot 14 and rod 11. The wind velocity and direction and ice accumulations matched the independent obsevatory readings.

TEST EXAMPLE 2

The ice weight threshold was set at 0.3 pound. Independent icing intensity measurements were made 15 minutes before the test began. This indicated that the icing conditions were: LWC=0.78 gm/cu.M, droplet dia.=15 microns, Distribution "E", Fog, winds 60 MPH. The test began by removing any ice formations present on the rod 11 and boot 14. The ice accumulated for 1 hr. and reached the ice threshold weight. The upper platform 15a boot 23 and cylindrical member 15b boot 24 were inflated to remove bridging ice. One reading is taken after the ice clearing operation, then the boot 14 was inflated to de-ice the rod 11. This pattern was continued until the test ended. The wind velocity and direction agreed with observatory measurements during the duration of the tests as did the ice accumulations.

The electrical strain gauges can be of the capacitance and semi-conductor types; however they are not preferred because of drift on the zero setting once they are calibrated. The elecrical resistance film type strain gauges are preferred and the foil gauges are most preferred.

The use of inflatable boots is preferred for ice removal. It will be appreciated that conventional means such as heaters can be used in the detector apparatus.

It is intended that the foregoing description be illustrative of the present invention and that this invention be limited only by the hereinafter appended claims.

Appendix A
TURBO PASCAL
Program: Ice: Data

```
Program IceData;

Type
  Str80 = String[80];
  Str2 = String[2];
  ChanArray = Array [1..4] of Real;
  TimeString = String[3];
  DataString = String[10];
  Data = Record
            DateCode : DateString;
            TimeCode : TimeString;
            Field0,Field1,Field2,Field3,Field4,Field5,Field6 : Integer;
         End;

Var
  Hours,RecPeriod,DisplayFac,SampleNum,Month,Day,Year,Status : Integer;
  IOut,IDay,IMain : Integer;
  Time : TimeString;
  Date : DataString;
  Hex : Str2;
  Line : Str80;
  Seconds,C0,C1,C2,C3,C4,C5,C6 : Real;
  CurrentTime,OldTime,EndTime,SampleTime : Real;
  ShedTime,ShedPeriod,ShedThreshold : Real;
  FreeTime,FreePeriod,FreeThreshold : Real;
  Fice,F1Prime,F2Prime,F3Prime,NorthVector,EastVector : Real;
  Theta,WindSpeed,WindDir : Real;
  Flag,ErrorMain,Printer : Boolean;
  C : ChanArray;
  DataFileName : String[8];
  DataFile : File of Data;
  DataRec : Data;
  StatI : Integer;

Const
  CTRL_X = #$18;
  Gain0 = 0.00;
  Gain1 = 1.64;
  Gain2 = 1.55;
  Gain3 = 1.61;
  Gain4 = 1.59;
  Gain5 = 1.50;
  Gain6 = 1.50;
  Offset0 = 0.00;
  Offset1 =-0.15;
  Offset2 =-0.10;
  Offset3 = 0.12;

Procedure Quit(OpenFile:Boolean);
Begin
  ClrScr;
  GoToXY(25,10);
  Write('** FATAL UMAC COMMUNICATION ERROR **');
  GoToXY(30,15);
  Write(Date,'   ',Time);
  If (OpenFile) Then Close(DataFile);
  Halt;
End;

Procedure GetTime(var Time : TimeString; var Seconds : Real);
Type
  RegPack = Record
              ax,bx,cx,dx,bp,di,si,ds,es,flags : Integer;
            End;

Var
  Registers : RegPack;
```

```
    ah,al,ch,cl,dh : Byte;
    Hr, Min, Sec : String[2];
    IHour, IMinute, ISecond : Integer;
Begin
    ah:=$2C;
    With Registers Do
    Begin
        ax:=ah shl 8+al;
    End;
    Intr($21,Registers);
    With Registers Do
    Begin
        IHour:=cx shr 8;
        Str(IHour:2,Hr);
        IMinute:=cx mod 256;
        Str(IMinute:2,Min);
        ISecond:=dx shr 8;
        Str(ISecond:2,Sec);
    End;
    Seconds:=3600.*IHour+60.*IMinute+ISecond;
    Time:=Hr+':'+Min+':'+Sec;
    If (Time[1]=' ') Then Time[1]:='0';
    If (Time[4]=' ') Then Time[4]:='0';
    If (Time[7]=' ') Then Time[7]:='0';
End;

Procedure GetDate(var Date : DateString; var Month, Day, Year : Integer);
Type
    RegPack = Record
                ax,bx,cx,dx,bp,di,si,ds,es,flags : Integer;
            End;

Var
    Registers : RegPack;
    dx,cx : Integer;
    SMonth, SDay : String[2];
    SYear : String[4];

Begin
    With Registers Do
    Begin
        ax:=$2A shl 8;
    End;
    MsDos(Registers);
    With Registers Do
    Begin
        Year:=cx;
        Str(Year:4,SYear);
        Day:=dx mod 256;
        Str(Day:2,SDay);
        Month:=dx shr 8;
        Str(Month:2,SMonth);
    End;
    Date:=SMonth+'/'+SDay+'/'+SYear;
    If (Date[1]=' ') Then Date[1]:='0';
    If (Date[4]=' ') Then Date[4]:='0';
End;

Function CheckSum(Var S : Str80 ) : Integer;
Var
    I,Sum : Integer;

Begin
    Sum:=0;
    For I:=1 to Length(S) Do
    Begin
        Sum:=Sum+Ord(S[I]);
    End;
    CheckSum:=Lo(Sum);
End;

Function HexToInt(Var S : Str2 ) : Integer;
```

```
Var
   I, Sum, Temp : Integer;

Const
   HexChars = '0123456789ABCDEF';

Begin
   Sum:=(Pos(S[1],HexChars)-1)*16;
   Sum:=Sum+(Pos(S[2],HexChars)-1);
   HexToInt:=Sum;
End;

Function IntToHex( J : Integer ) : Str2;

Var
   Temp, I : Integer;
   Ans : String[2];

Const
   HexChars = '0123456789ABCDEF';

Begin
   Temp:=Trunc(J/16);
   Ans[1]:=Copy(HexChars,Temp+1,1);
   J:=J-(Temp*16);
   Ans[2]:=Copy(HexChars,J+1,1);
   IntToHex:=Ans;
End;

Procedure ErrorCheck(Var Line : Str80; Var ErrorFlag : Boolean;
                    Var Status : Integer);

Var
   Sum, LineLength : Integer;
   SumHex, StatusHex : Str2;
   SubString : Str80;

Begin
   ErrorFlag:=False;
   LineLength:=Length(Line);
   If ((LineLength <> 7) and (LineLength <> 38)) Then ErrorFlag:=True;
   If (not ErrorFlag) Then
   Begin
      If (Copy(Line,1,1) <> '*') Then ErrorFlag:=True;
      SubString:=Copy(Line,1,LineLength-2);
      Sum:=CheckSum(SubString);
      SumHex:=IntToHex(Sum);
      If (SumHex <> Copy(Line,LineLength-1,2)) Then ErrorFlag:=True;
      StatusHex:=Copy(Line,2,2);
      Status:=HexToInt(StatusHex);
      If (Status <> 0) Then ErrorFlag:=True;
   End;
End;

Procedure Scan( Block : Integer; Var Chan : ChanArray;
                Var Status : Integer; Var FatalError :Boolean );

( ** Block = 0, 1, or 2 to select channels 0-3, 4-7, or 8-11 )

Var
   N,M,SumHex : Str2;
   Command,Reply : Str80;
   Offset,NumError,Sum,Ierror,I : Integer;
   Error : Boolean;
   Value : Real;

Begin
   Str(Block*4,N);
   Str(3+(Block*4),M);
   NumError:=0;
   FatalError:=False;
   Command:='*0:SCA/'+N+'/'+M+':';
   Sum:=CheckSum(Command);
```

```
    SumH x:=IntToHex(Sum);
    Command:=Command+SumHex;
    Repeat
      WriteLn(Aux,Command);
      ReadLn(Aux,Reply);
{      Reply:='*00:-11.111/+22.222/-33.333/+44.444:E5'; }
      ErrorCheck(Reply,Error,Status);
      If (Error) Then NumError:=NumError+1;
      If (NumError > 5) Then
      Begin
         Error:=False;
         FatalError:=True;
      End;
    Until (not Error);
    If (not FatalError) Then
    Begin
      For I:=1 to 4 Do
      Begin
        Offset:=6+8*(I-1);
        Val(Copy(Reply,Offset,6),Value,Ierror);
        Chan[I]:=Value;
        If (Copy(Reply,Offset,6) = 'OVLOAD') Then
        Begin
          Case Block of
          0,1 : Chan[I]:=199.99;
          2   : Chan[I]:=19.999;
          End;
        End;
        If (Copy(Reply,Offset-1,1) = '-') Then Chan[I]:=-Chan[I];
      End;
    End;
End;

Procedure GetStatus( Var Status : Integer; Var FatalError : Boolean);
Var
  NumError : Integer;
  Error : Boolean;
  Reply : Str80;

Begin
  NumError:=0;
  FatalError:=False;
  Repeat
    WriteLn(Aux,'*0:STA:B6');
    ReadLn(Aux,Reply);
{    Reply:='*00::FE';     }
    ErrorCheck(Reply,Error,Status);
    If (Error) Then NumError:=NumError+1;
    If (NumError > 5) Then
    Begin
       Error:=False;
       FatalError:=True;
    End;
  Until (not Error);
End;

Procedure BitSwitch( Bit,Port,Value : Integer; Var Status : Integer;
                 Var FatalError : Boolean);

Var
  B,P,SumHex : Str2;
  Command,Reply : Str80;
  Offset,NumError,Sum,Ierror : Integer;
  Error : Boolean;

Begin
  Str(Bit,B);
  Str(Port,P);
  NumError:=0;
  FatalError:=False;
  If (Value=1) Then
    Command:='*0:SET/'+P+'/'+B+':'
  else
    Command:='*0:CLE/'+P+'/'+B+':';
```

```
   Sum:=CheckSum(Command);
   SumHex:=IntToHex(Sum);
   Command:=Command+SumHex;
   Repeat
      WriteLn(Aux,Command);
      ReadLn(Aux,Reply);
   {  Reply:='*00::FE'; }
      ErrorCheck(Reply,Error,Status);
      If (Error) Then NumError:=NumError+1;
      If (NumError > 5) Then
      Begin
         Error:=False;
         FatalError:=True;
      End;
   Until (not Error);
End;

Procedure Inputs;

Var
   Ans : Char;
   Satisfied : Boolean;
   Bytes : Real;

Begin
   ClrScr;
   GoToXY(1,5);
   WriteLn('Greetings, Oh Slave of the Frozen North !');
   WriteLn;
   WriteLn('Please make sure that I am connected with the UMAC,');
   WriteLn('and see to it that all power supplies are turned on.');
   WriteLn('You should also have a data disk mounted on the B drive.');
   WriteLn('I await the wisdom of your commands !');
   GoTOXY(20,25);
   Write('Press any key to continue');
   While (not Keypressed) Do;
   ClrScr;

{ ** Reset the UMAC ** }

GetTime(Time,Seconds);
   GetDate(Date,Month,Day,Year);
   Write(Aux,CTRL_X);
   Delay(3000);
   GetStatus(Status,ErrorMain);
   If (ErrorMain) Then Quit(False);

Satisfied:=False;
   Repeat
      ClrScr;
      WriteLn('** These questions must be answered with INTEGER responses **');
      WriteLn;
      Write('Enter the desired data recording period (s): ');
      ReadLn(RecPeriod);
      Write('How many data sets should be recorded per display update? ');
      ReadLn(DisplayFac);
      Write('Enter number of data samples to average per recording period: ');
      ReadLn(SampleNum);
      Write('Enter number of hours to take data: ');
      ReadLn(Hours);
      Write('Enter the ice weight threshold ( (300 ) for boot inflation: ');
      ReadLn(ShedThreshold);
      Write('Enter the maximum time interval between boot inflations (min): ');
      ReadLn(ShedPeriod);
      Write('Enter the ice weight threshold ( (300 ) for ice clearing: ');
      ReadLn(FreeThreshold);
      Write('Enter the maximum time interval between ice clearing (min): ');
      ReadLn(FreePeriod);
      ClrScr;
      WriteLn('The selected recording period is ',RecPeriod,' second(s).');
      WriteLn(SampleNum,' data sample(s) will be averaged prior to recording.');
      WriteLn('Data sets will be added to the display every ',RecPeriod*
              DisplayFac,' second(s).');
```

```
  WriteLn('Data will be acquired automatically for ',Hours,' hour(s).');
  WriteLn('Ice will be shed every ',ShedPeriod:5:0,' minutes or each time');
  WriteLn('the ice load exceeds ',ShedThreshold:7:2,' units.');
  WriteLn('Ice will be cleared every ',FreePeriod:5:0,' minutes or each time WriteLn('the ice load exceeds ',FreeThreshold:7:2,' units.');
  Bytes:=(Hours*3600.*34./RecPeriod)+(Hours*60.0/ShedPeriod);
  WriteLn(Bytes:7:0,' data bytes will be recorded.');
  WriteLn;
  If (Bytes > 2.E+5) Then WriteLn('** WARNING ** Disk Storage Limited to',
                                  ' 320K Bytes.');
  WriteLn;
  Write('Are these selections satisfactory (Y or N): ');
  ReadLn(Ans);
  If (UpCase(Ans) = 'Y') Then Satisfied:=True;
Until Satisfied;
ShedPeriod:=ShedPeriod*60.0;    { Convert to seconds }
FreePeriod:=FreePeriod*60.0;
ClrScr;
WriteLn('Please enter a name (1-8 letters) for the file where your data',
        ' will be stored.');
WriteLn;
WriteLn('** WARNING ** If you sepcify an existing file, its contents will',
        ' be lost!');
WriteLn;
Write('Filename: ');
ReadLn(DataFileName);
Assign(DataFile,'B:'+DataFileName+'.DAT');
ReWrite(DataFile);

{ ** Write Input Parameters to Data File ** }
With DataRec Do
Begin
   DateCode:=Date;
   TimeCode:='*Gain* '; Field0:=Trunc(Gain0*100.0);
   Field1:=Trunc(Gain1*100.0); Field2:=Trunc(Gain2*100.0);
   Field3:=Trunc(Gain3*100.0);
   Field4:=0; Field5:=0; Field6:=0;
   Write(DataFile,DataRec);
   TimeCode:='*Offset*'; Field0:=Trunc(Offset0*100.0);
   Field1:=Trunc(Offset1*100.0); Field2:=Trunc(Offset2*100.0);
   Field3:=Trunc(Offset3*100.0);
   Write(DataFile,DataRec);
{ ** Note that RecPeriod, FreePeriod and ShedPeriod are not scaled by 100. ** }
   TimeCode:='*Inputs*'; Field0:=RecPeriod;
   Field1:=Trunc(SampleNum*100.0); Field2:=Trunc(ShedPeriod/60.0);
   Field3:=Trunc(ShedThreshold*100.0);
   Field4:=Trunc(FreePeriod/60.0); Field5:=Trunc(FreeThreshold*100.0);
   Write(DataFile,DataRec);
End;
ClrScr;
WriteLn('All of the displayed data may be echoed to the printer.');
WriteLn('However, please be aware that although I check the printer');
WriteLn('status before sending it characters to print, the program will');
WriteLn('hang if a printer fault (paper out, ribbon out etc.) occurs');
WriteLn('while a line is being printed. Should this be the case, data');
WriteLn('collection will resume only after correcting the printer fault.');
WriteLn;
Write('Do you wish to echo data to the printer (Y or N)? ');
Read(Ans);
If (UpCase(Ans) = 'Y') Then Printer:=True else Printer:=False;
ClrScr;
GoToXY(20,25);
Write('Press any key to start collecting data');
While (not KeyPressed) Do
Begin
   GetTime(Time,Seconds);
   GetDate(Date,Month,Day,Year);
   GoToXY(25,1);
   Write(Date,'   ',Time);
   Delay(100);
End;
WriteLn;
ClrScr;
```

```
End;

Procedure ScreenOut(G1,G2,G3,G4,T1,T2,V : Real);

Begin
   Window(1,1,80,1);
   GoToXY(1,1);
   Write('   Time      CH00     CH01      CH02      CH03     Temp1',
         '    Temp2    Voltage ');
   Window(1,2,80,22);
   GoToXY(1,1);
   InsLine;
   WriteLn(Time,G1:9:2,G2:9:2,G3:9:2,G4:9:2,T1:9:2,T2:9:2,V:11:3);
   Window(1,24,80,25);
   GoToXY(1,1);
   WriteLn('Date: ',Date,'  Ice Load: ',Fice:8:3);
   Write('Wind Speed: ',WindSpeed:7:2,'   Wind Direction: ',WindDir:5:0);
   Window(1,1,80,25);
   GoToXY(1,1);
End;

Procedure Print(G1,G2,G3,G4,T1,T2,V : Real);
Var
   PrinterFault : Boolean;

Const
   FormFeed = #$0C;
   ILine : Integer = 0;

Begin
If ((Port[$1C] and $F0) = $D0) Then PrinterFault:=False else PrinterFault:=Tru
   If (not PrinterFault) Then
   Begin
      If ((ILine mod 50) = 0) Then
      Begin
      {  Write(Lst,FormFeed);  }
         WriteLn(Lst,'Date: '+Date:80);
         WriteLn(Lst);
         WriteLn(Lst,'          Time     CH00     CH01      CH02      CH03     Temp1'
                 ,'    Temp2    Voltage ');
         WriteLn(Lst);
      End;
      WriteLn(Lst,'     ',Time,G1:9:2,G2:9:2,G3:9:2,G4:9:2,T1:9:2,T2:9:2,V:11:3);
      ILine:=ILine+1;
   End;
End;

Procedure ShedIce;

Begin
   ShedTime:=ShedTime+ShedPeriod;
   GoToXY(1,25);
   Write(' *****  Shedding Ice at: ',Time,'  *****
   For IMain:= 1 To 1 Do
   Begin
      BitSwitch(1,1,1,Status,ErrorMain);
      If (ErrorMain) Then Quit(True);
      Delay(5000);
      BitSwitch(1,1,0,Status,ErrorMain);
      If (ErrorMain) Then Quit(True);
      Delay(3000);
   End;
   With DataRec Do
   Begin
      TimeCode:='Ice Shed';
      Write(DataFile,DataRec);
   End;
End;

Procedure FreeProbe;

Begin
   FreeTime:=FreeTime+FreePeriod;
   GoToXY(1,25);
```

```
   Write(' ***** Clearing Probe at: ',Time,'  *****         ');
   For IMain:= 1 To 1 Do
   Begin
     BitSwitch(5,1,1,Status,ErrorMain);
     If (ErrorMain) Then Quit(True);
     Delay(8000);
     BitSwitch(5,1,0,Status,ErrorMain);
     If (ErrorMain) Then Quit(True);
     Delay(3000);
   End;
   With DataRec Do
   Begin
     TimeCode:='ClearIce';
     Write(DataFile,DataRec);
   End;
End;

Procedure GetData;

Begin
  SampleTime:=SampleTime+RecPeriod;
  GetDate(Date,Day,Month,Year);
  C0:=0; C1:=0; C2:=0; C3:=0; C4:=0; C5:=0; C8:=0;
  For IMain:=1 to SampleNum Do
  Begin
    Scan(0,C,StatI,ErrorMain);
    If (ErrorMain) Then Quit(True);
    C0:=C[1]+C0;
    C1:=C[2]+C1;
    C2:=C[3]+C2;
    C3:=C[4]+C3;
    Scan(1,C,StatI,ErrorMain);
    If (ErrorMain) Then Quit(True);
    C4:=C[1]+C4;
    C5:=C[2]+C5;
    Scan(2,C,StatI,ErrorMain);
    If (ErrorMain) Then Quit(True);
    C8:=C[1]+C8;
  End;
  If (SampleNum > 1) Then
  Begin
    C0:=C0/SampleNum; C1:=C1/SampleNum; C2:=C2/SampleNum;
    C3:=C3/SampleNum; C4:=C4/SampleNum; C5:=C5/SampleNum; C8:=C8/SampleNum;
  End;
{ ** Adjust for gain and offset ** }
  C0:=(C0-Offset0)*Gain0;
  C1:=(C1-Offset1);
  If (C1 <=0.0) Then C1:=C1*Gain1 else C1:=C1*Gain4;
  C2:=(C2-Offset2);
  If (C2 <=0.0) Then C2:=C2*Gain2 else C2:=C2*Gain5;
  C3:=(C3-Offset3);
  If (C3 <=0.0) Then C3:=C3*Gain3 else C3:=C3*Gain6;
{ ** Compute Ice Load, Wind Direction, and Wind Speed ** }
  Fice:=-(C1+C2+C3);
  F1Prime:=C1+(Fice/3.0);
  F2Prime:=C2+(Fice/3.0);
  F3Prime:=C3+(Fice/3.0);
  NorthVector:=0.154*(2.0*F1Prime-F2Prime-F3Prime);
  EastVector:=0.269*(F2Prime-F3Prime);
  If (NorthVector = 0.0) Then NorthVector:=0.001;
  Theta:=ArcTan(EastVector/NorthVector);
  WindSpeed:=100*Sqrt(Sqr(EastVector)+Sqr(NorthVector));
  Theta:=Theta*180./Pi;
  If (NorthVector >= 0.0) Then
    If (EastVector >= 0.0) Then WindDir:=Theta else WindDir:=360.+Theta;
  If (NorthVector < 0.0) Then WindDir:=180.+Theta;

If ((IOut mod DisplayFac) = 0) Then
  Begin
    ScreenOut(C0,C1,C2,C3,C4,C5,C8);
    If (Printer) Then Print(C0,C1,C2,C3,C4,C5,C8);
  End;
  IOut:=IOut+1;
  With DataRec Do
```

```
Begin
  DateCode:=Date; TimeCode:=Time;
  Field0:=Trunc(C0*100); Field1:=Trunc(C1*100);
  Field2:=Trunc(C2*100); Field3:=Trunc(C3*100);
  Field4:=Trunc(C4*100); Field5:=Trunc(C5*100); Field6:=Trunc(C8*1000);
  Write(DataFile,DataRec);
End;
End;

{ ** The Main Program Starts Here ** }

Begin
  TextMode(2);
  Inputs;
  OldTime:=Seconds;
  SampleTime:=Seconds;
  EndTime:=3.6E+3*Hours+Seconds;
  ShedTime:=Seconds;
  FreeTime:=Seconds;
  IDay:=0;
  IOut:=0;
  Repeat
    GetTime(Time,Seconds);
    If (Seconds < OldTime) Then IDay:=IDay+1;
    CurrentTime:=Seconds+(IDay*8.64E+4);
    OldTime:=Seconds;
    If (CurrentTime)=SampleTime) Then GetData;
    If ((CurrentTime)=ShedTime) or (Fice)=ShedThreshold)) Then
    Begin
      FreeProbe;
      ShedIce;
    End;
    If ((CurrentTime)=FreeTime) or (Fice)=FreeThreshold)) Then FreeProbe;
    Delay(100);
  Until (KeyPressed or (CurrentTime > EndTime));
  Close(DataFile);
```

We claim:

1. A detector apparatus which comprises:
   (a) an elongate cylindrically shaped rod having a longitudinal axis and two opposed ends along the longitudinal axis with one supported and the other end unsupported;
   (b) support means rigidly mounting the one end of the rod such that the rod is cantilevered from the support means and wherein there is a region of high stress in tension and compresssion in the rod or support means when a force is applied to the rod;
   (c) electrical strain gauges mounted on the region of high stress in uniform relationship to and around the longitudinal axis of the rod, wherein the apparatus includes electrical measuring means which measure wind velocity and direction around the longitudinal axis of the rod and measure weight of accumulated ice on the rod as a function of time in relation to compression or tension on the strain gauges; and
   (d) deicer means for removal of ice from the rod.

2. A detector apparatus which comprises:
   (a) an elongate cylindrically shaped rod having a longitudinal axis and two opposed ends along the longitudinal axis with one end supported and the other end unsupported;
   (b) identical arms rigidly supporting the one end of the rod and extending from the rod to arm ends around the longitudinal axis of the rod, wherein each of the arms has a section of substantially identical cross-section adjacent the rod where tension or compression is to be measured along one line in the section;
   (c) support means rigidly mounting the ends of the arms such that the rod is cantilevered from the support means by the arms;
   (d) electrical resistance film strain gauges rigidly mounted on the section of the arms in uniform relationship to and around the longitudinal axis of the rod to measure tension and compression in the one line of the section, wherein the apparatus includes electrical measuring means which measure wind velocity and direction around the longitudinal axis of the rod and measure weight of accumulated ice on the rod as a function of time in relation to compression or tension on the strain gauges; and
   (e) deicer means for removal of ice from the rod.

3. The apparatus of claim 2 wherein the rod is enclosed by an inflatable boot mounted on the rod as the deicer means for breaking and then removing accumulated ice on the rod when the boot is inflated.

4. The apparatus of claim 2 wherein the arms extend along and parallel to the longitudinal axis of the rod.

5. The apparatus of claim 2 wherein the arms extend perpendicular to the longitudinal axis of the rod.

6. A detector apparatus which comprises:
   (a) an elongate cylindrically shaped rod having a longitudinal axis and two opposed ends with one end supported and the other end unsupported;
   (b) a hub rigidly supporting the one end of the rod and having identical arms which extend radially away from the rod to radial ends and perpendicular to the longitudinal axis of the rod wherein each of the arms has a section of substantially identical cross-section adjacent the rod where tension or compression is to be measured along one line in the section;

(c) support means rigidly mounting the radial ends of the arms such that the rod is cantilevered from the support means by the hub and arms;

(d) electrical resistance film strain gauges rigidly mounted on the section of the arms in uniform spaced radial relationship to and around the longitudinal axis of the rod to measure tension and compression along the one line of the section, wherein the apparatus includes electrical measuring means which measure wind velocity and direction around the longitudinal axis of the rod and measure weight of accumulated ice on the rod as a function of time in relation to compression or tension on the strain gauges; and (e) deicer means for removal of ice from the rod.

7. The apparatus of claim 6 wherein the radial ends of the arms are supported on rubber o-ring seals which fit into circular openings in the support means and wherein the arms are held in place in the openings in the support means by screws which project radially from the arms.

8. The apparatus of claim 7 wherein there are three arms.

9. The apparatus of claim 6 wherein the support means has a cylindrical cross-section.

10. The apparatus of claim 6 wherein the rod and support means are enclosed by at least one inflatable boot as the deicer means for removing accumulated ice on the rod and support means when inflated.

11. A detection system which comprises:
(a) an elongate cylindrically shaped rod having a longitudinal axis and two opposed ends along the longitudinal axis with one end supported and the other end unsupported;
(b) identical arms rigidly supporting the one end of the rod and extending from the rod to arm ends around the longitudinal axis of the rod, wherein each of the arms has a section of substantially identical cross-section adjacent the rod where tension or compression is measured along one line of the section;
(c) support means rigidly mounting the ends of the arms such that the rod is cantilevered from the support means by the arms;
(d) electrical resistance film strain gauges rigidly mounted on the section of the arms in uniform relationship to and around the longitudinal axis of the rod to measure tension and compression along the one line of the section, wherein the apparatus includes electrical measuring means which measure wind velocity and direction around the longitudinal axis of the rod and measure weight of accumulated ice on the rod as a function of time in relation to compression or tension on the strain gauges;
(e) microprocessor means electrically connected to the strain gauges which are connected in a bridge circuit, wherein the microprocessor means converts electrical signals from the strain gauges to digital data which is supplied to the measuring means; and
(f) deicer means for removing ice from the rod.

12. The system of claim 11 wherein the microprocessor is in a computer with a display means for displaying the wind velocity or ice weight on the rod.

13. The system of claim 11 wherein the rod is enclosed by at least one inflatable boot as the deicer means for removing accumulated ice on the rod when inflated.

14. The system of claim 11 wherein the arms extend along and parallel to the longitudinal axis of the rod.

15. The system of claim 11 wherein the arms extend perpendicular to the longitudinal axis of the rod.

16. A detection system which comprises:
(a) an elongate cylindrically shaped rod having a longitudinal axis and two opposed ends along the longitudinal axis with one end supported and the other end unsupported;
(b) a hub rigidly supporting the one end of the rod and having identical arms which extend radially away from the rod to radial ends and perpendicular to the longitudinal axis of the rod wherein each of the arms has a section of substantially identical cross-section adjacent the rod wherein tension or compression is to be measured along one line in the section;
(c) support means rigidly mounting the radial ends of the arms such that the rod is cantilevered from the support means by the hub and arms; and
(d) electrical resistance film strain gauges rigidly mounted on the section of the arms in uniform spaced radial relationship to and around the longitudinal axis of the rod to measure tension and compression along the one line of the section, wherein the apparatus includes electrical measuring means which measure wind velocity and direction around the longitudinal axis of the rod and measure weight of accumulated ice on the rod as a function of time in relation to compression or tension on the strain gauges;
(e) microprocessor means electrically connected to the strain gauges which are in a bridge circuit, wherein the microprocessor means converts electrical signals from the strain gauges to digital data; and
(f) deicer means for removal of ice from the rod.

17. The system of claim 16 wherein the microprocessor is a computer with a display means for displaying wind velocity or ice weight on the rod.

18. The system of claim 16 wherein the radial ends of the arms are supported on rubber o-ring seals which fit into circular openings in the support means and wherein the arms are held in place in the openings in the support means by screws supporting the O-ring seals which project radially from the arms.

19. The system of claim 18 wherein there are three arms.

20. The system of claim 16 wherein the support means has a cylindrical cross-section.

21. The system of claim 16 wherein the rod and support means are enclosed by at least one inflatable boot as the deicer means for removing accumulated ice on the rod and support means when inflated.

22. A method for measuring wind velocity and direction and accumulated ice weight which comprises:
(a) providing a detector apparatus in an environment wherein ice accumulates which comprises: a detector apparatus which comprises: an elongate cylindrically shaped rod having a longitudinal axis and two opposed ends along the longitudinal axis with one end supported and the other end unsupported; support means rigidly mounting the one end of the rod such that the rod is cantilevered from the support means and wherein there is a region of high stress in tension and compression when a force is applied to the rod; electrical strain gauges mounted on the region of high stress in unifrom relationship to and around the longitudinal axis of the rod, wherein the apparatus includes electrical measuring means which measure wind velocity and direction around the longitudinal axis of the rod and which measures weight of accumulated ice on the rod as a function of time in relation to compression or tension on the strain gauges; and deicer means for removal of ice from the rod;

(b) measuring with the srain gauges the wind velocity and direction on the rod after the ice has been removed by the deicer means and the accumulated ice weight on the rod before removal of the ice by the deicer means.

23. The method of claim 22 wherein the rod is enclosed by at least one inflatable boot mounted on the rod as the deicer means and wherein as ice accumulates on the boot it is periodically removed by inflating the boot and then the wind velocity and direction is measured.

24. the method of claim 22 wherein the ice is removed from the rod by the deicer means just prior to measurement of the wind velocity and direction.

25. A detection system which comprises:

(a) an elongate cylindrically shaped rod having a longitudinal axis and two opposed ends along the longitudinal axis with one end supported and the other end unsupported;

(b) support means rigidly mounting the one end of the rod such that the rod is cantilevered from the support means and wherein there is a region of high stress in tension and compression in the rod or support means when a force is applied to the rod;

(c) electrical strain gauges mounted on the region of high stress in uniform relationship to and around the longitudinal axis of the rod, wherein the apparatus includes electrical measuring means which measure wind velocity and direction around the longitudinal axis of the rod and measure weight of accumulated ice on the rod as a function of time in relation to compression or tension on the strain gauges;

(d) microprocessor means electrically connected in a bridge circuit, wherein the microprocessor means converts electrical signals from the strain gauges to digital data which is supplied to the measuring means; and (e) deicer means for removal of ice from the rod.

* * * * *

UNITED STATES PATENT AND TRADEMARK OFFICE
CERTIFICATE OF CORRECTION

PATENT NO. : 4,730,485
DATED : March 15, 1988
INVENTOR(S) : Charles H. Franklin, Clarence S. Vinton and Conrad O. Rogne It is certified that error appears in the above—identified patent and that said Letters Patent is hereby corrected as shown below:

Under "U.S. Patent Documents" Bristol "2,477,238" should be --2,477,233--.

Column 1, line 29 "the" should be --The--.

Column 2, line 7 "am" should be --arm--.

Column 4, line 17 "guages" should be --gauges--.

Column 5, line 6, "circuit" should be --conduit--.

Column 5, line 16 "know" should be --known--.

Column 5, line 30 "an" should be --and--.

Column 6, line 50 "srain" should be --strain--.

Column 6, line 67 "amplifier" should be --amplifiers--.

Column 7, line 60 "the", second occurrence should be --The--.

Column 7, line 63 "as", second occurrence, should be --a--.

UNITED STATES PATENT AND TRADEMARK OFFICE
CERTIFICATE OF CORRECTION

PATENT NO. : 4,730,485

DATED : March 15, 1988

INVENTOR(S) : Charles H. Franklin, Clarence S. Vinton and Conrad O. Rogne

It is certified that error appears in the above—identified patent and that said Letters Patent is hereby corrected as shown below:

Column 8, line 37 "dedicted" should be --dedicated--.

Column 9, line 53 "controled" should be --controlled--.

Column 27, line 39, after "one" insert --end--.

Column 30, line 18 "wherein" should be --where--.

Column 31, line 13 "srain" should be --strain--.

Column 31, line 24, "the", first occurrence should be --The--.

Signed and Sealed this

Twenty-seventh Day of September, 1988

Attest:

DONALD J. QUIGG

*Attesting Officer*  *Commissioner of Patents and Trademarks*